US006496361B2

United States Patent
Kim et al.

(10) Patent No.: US 6,496,361 B2
(45) Date of Patent: *Dec. 17, 2002

(54) EMBEDDED CMOS CAMERA IN A LAPTOP COMPUTER

(75) Inventors: Jason S. Kim, Campbell, CA (US); Richard T. Hsu, San Jose, CA (US)

(73) Assignee: Acer Incorporated (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,837

(22) Filed: Nov. 16, 1998

(65) Prior Publication Data

US 2001/0014006 A1 Aug. 16, 2001

(51) Int. Cl.[7] .................................................. G06F 1/16
(52) U.S. Cl. ....................... 361/683; 361/686; 395/893; 348/376
(58) Field of Search ................................. 361/683, 686; 361/705.01; 395/893; 348/376

(56) References Cited

U.S. PATENT DOCUMENTS

| | | | |
|---|---|---|---|
| 5,359,362 A | 10/1994 | Lewis et al. ................ 348/15 |
| 5,402,170 A | 3/1995 | Parulski et al. ............ 348/211 |
| 5,463,742 A | 10/1995 | Kobayashi .................. 395/281 |
| 5,550,754 A | 8/1996 | McNelley et al. ........ 364/514 A |
| 5,576,757 A | 11/1996 | Roberts et al. .............. 348/207 |
| 5,634,144 A | 5/1997 | Mauro et al. ................. 396/57 |
| 5,708,853 A | * 1/1998 | Sanemitsu ................... 395/893 |
| 5,710,728 A | 1/1998 | Danielson et al. .......... 364/707 |
| 5,748,441 A | 5/1998 | Loritz et al. ................ 361/683 |
| 5,768,163 A | * 6/1998 | Smith, II ................ 364/705.01 |
| 5,983,073 A | * 11/1999 | Ditzik ........................ 455/11.1 |
| 6,094,700 A | * 7/2000 | Deschepper et al. ........ 710/129 |

OTHER PUBLICATIONS

Pathak, Sanjiv, "The Zoomed Video Port for PC Cards," Copyright PCMCIA Mar. 1996, pp. 1–4.

* cited by examiner

*Primary Examiner*—Darren Schuberg
*Assistant Examiner*—Yean-Hsi Chang
(74) *Attorney, Agent, or Firm*—Townsend and Townsend and Crew LLP (57) ABSTRACT

A laptop computer includes a video camera mounted to the lid, preferably embedded into the bezel above the display. The camera includes a CMOS imaging array, video data from which is communicated along a dedicated path from the camera to a graphics controller for output to the display, thereby bypassing the system bus. This makes it possible to display full frame, full data rate video with minimum impact on the overall system performance. Panning and zooming are implemented by software that controls the addresses in the pixel array from which data are transferred to the graphics controller's associated display memory.

16 Claims, 6 Drawing Sheets

EMBEDDED CMOS CAMERA IN A LAPTOP COMPUTER

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This application relates generally to video cameras, and more specifically to CMOS cameras in laptop computers.

As video, telephony, and computers have merged, the need for a compact video camera that interfaces to the computer has arisen. Video conferencing is a natural application, but other applications abound. In view of this need, there have been developed small portable cameras that can sit on top of a computer monitor. An example is a family of cameras marketed under the QuickCam mark by Connectix Corporation of San Mateo, Calif.

As laptop computers have evolved, there was recognized a need to provide for improved video input. The Zoomed Video (ZV) port was defined to provide a dedicated video bus between a PC card slot and a VGA graphics controller. The ZV port bypasses the system buses and allows the direct transfer of digital video from a PC Card host adapter into the graphics controller's associated display memory.

SUMMARY OF THE INVENTION

The present invention provides enhanced video capabilities in the demanding environment of laptop computers. Embodiments of the present invention allow image panning and zooming without the need for delicate mechanical mechanisms.

A laptop computer according to an embodiment of the invention includes a video camera mounted to the lid, preferably embedded into the bezel above the display. The video data is communicated along a dedicated path from the camera to a graphics controller for output to the display, thereby bypassing the system bus. This makes it possible to display full frame, full data rate video with minimum impact on the overall system performance. In a preferred embodiment, the communication makes use of the graphics controller's Zoomed Video (ZV) port.

The camera has an imaging array (preferably a CMOS sensor array) and a fixed focal length lens (preferably wide angle). Panning and zooming are implemented by software that controls the addresses in the pixel array from which data are transferred to the graphics controller's associated display memory.

A further understanding of the nature and advantages of the present invention may be realized by reference to the remaining portions of the specification and the drawings.

DESCRIPTION OF SPECIFIC EMBODIMENTS

1.0 System Overview

Figure 1:
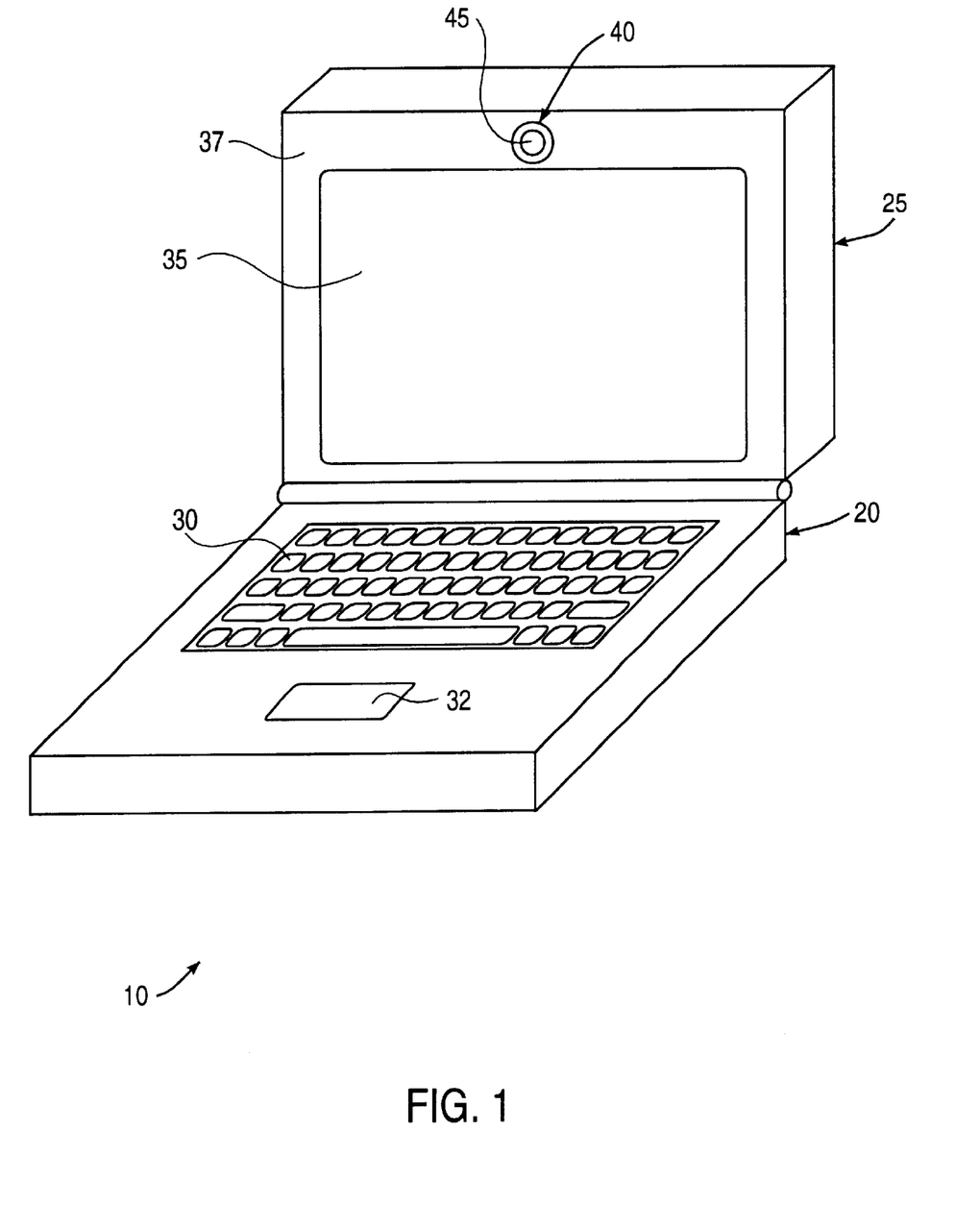
FIG. 1 is a perspective view of a laptop computer system embodying the present invention.

FIG. 1 is a perspective view of a laptop computer system 10 incorporating the present invention. In accordance with standard practice, the laptop computer includes a normally horizontal base portion 20 and a hinged lid portion 25. Base portion 20 includes a keyboard 30, a pointing device, such as a track pad 32, and system electronics (not shown) located inside the base portion generally under keyboard 30. Lid assembly 25 includes a flat panel display 35, typically a liquid crystal display (LCD), which is surrounded by a bezel 37. In accordance with the invention, CMOS camera 40, the lens 45 of which is shown in the figure, is mounted or embedded in bezel 37. The specific implementation of the laptop computer is an Intel-compatible processor (e.g., Pentium II with MMX) running Microsoft's Windows '98 or Windows NT operating system.

Figure 2:
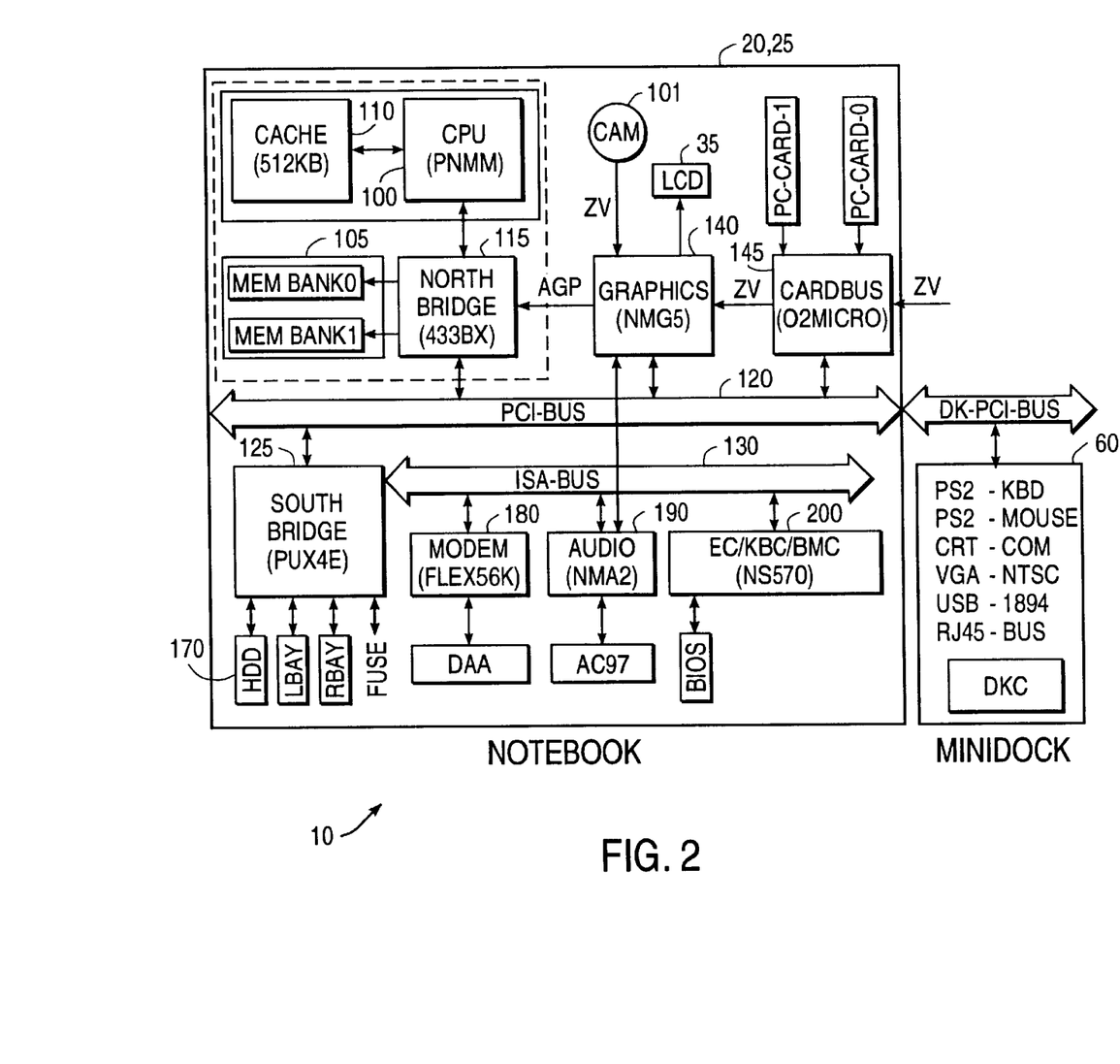
FIG. 2 is a high-level block diagram of the laptop computer system.

FIG. 2 is a high-level block diagram of laptop computer system 10. The figure is divided into two blocks, the first of which, designated "NOTEBOOK", contains substantially the elements in base 20 and lid assembly 25. The second block, designated "Minidock", provides additional connectivity options, including the capability of coupling to a full size keyboard and monitor. The elements in minidock 60 do not form part of this invention and will not be described in detail.

The basic architecture includes multiple buses over which a CPU 100 communicates with other system resources. The buses are arranged in a hierarchy based on speed and width. In particular, CPU 100 communicates with a memory subsystem and various I/O (peripheral) devices. The nature of these devices is well-known, but ones bearing on the invention will be described in more detail.

CPU 100 communicates with a memory subsystem that includes system memory 105 and second-level cache memory 110. Communication with system memory 105 is through a combination bridge and memory controller 115, referred to as the north bridge. North bridge 115 couples the CPU and memory subsystem to a high-speed peripheral bus such as a PCI bus 120. An additional bridge 125, referred to as the south bridge, couples the PCI bus to a low-speed peripheral bus 130. The low-speed peripheral bus is typically an industry standard expansion bus, such as an ISA bus, an EISA bus, or an MCA bus.

In general, PCI bus peripherals are faster and wider versions of the same types of peripherals that can be coupled to the expansion bus. For example, PCI bus 120 is a 32-bit bus that operates at 33 MHz while ISA bus 130 is a 16-bit bus-which operates at 8 MHz. The expansion bus has as its primary purpose compatibility with past generations of 8-bit and 16-bit peripheral devices whose function are such that they can still perform adequately in a modem system.

In the specific embodiment, the devices coupled to PCI bus 120 include a graphics controller 140 and a PC-card host adapter 145. Graphics controller 140 has an associated display memory, but in the specific embodiment graphics controller 140 is embodied in a MagicMedia™ (NM2200)

256AV 256-bit multimedia accelerator chip available from NeoMagic Corporation (3260 Jay Street, Santa Clara, Calif. 95054). This is a single chip that includes the graphics controller logic and the video memory. In addition to graphics capabilities, the particular chip integrates high-performance audio, video, and DVD playback capabilities. For this reason, graphics controller 140 will be referred to hereafter as media processor 140.

It should be understood, that for some purposes, the relevant functionality is that provided by the graphics controller portion of the chip. Media processor 140, in addition to being connected to the PCI bus as mentioned above, is connected via an advanced graphics port (AGP) to north bridge 115, thereby providing a bypass path so that certain transfers can occur without competing for bus cycles on PCI bus 120. Display 35 is coupled to media processor 140.

The media processor includes two video ports (zoomed video or ZV). Camera 40 is coupled to the media processor through one ZV port. In addition, PC-card host adapter 145 is coupled to media processor 140 through the other ZV port in order to provide a dedicated video bus for PC cards (e.g., video capture cards) that might be inserted in the laptop computer's PC-card slots.

A hard disk drive 170 is connected to south bridge 125. In the specific embodiment, devices coupled to ISA bus 130 include a modem 180, audio subsystem 190, and a support logic chip 200 (National Semiconductor PC87570), which provides keyboard and pointing device controllers, a battery management controller, an interface to a BIOS (basic input/output system) memory 210, and a real time clock.

2.0 Multimedia Subsystem
Multimedia Hardware

Figure 3:
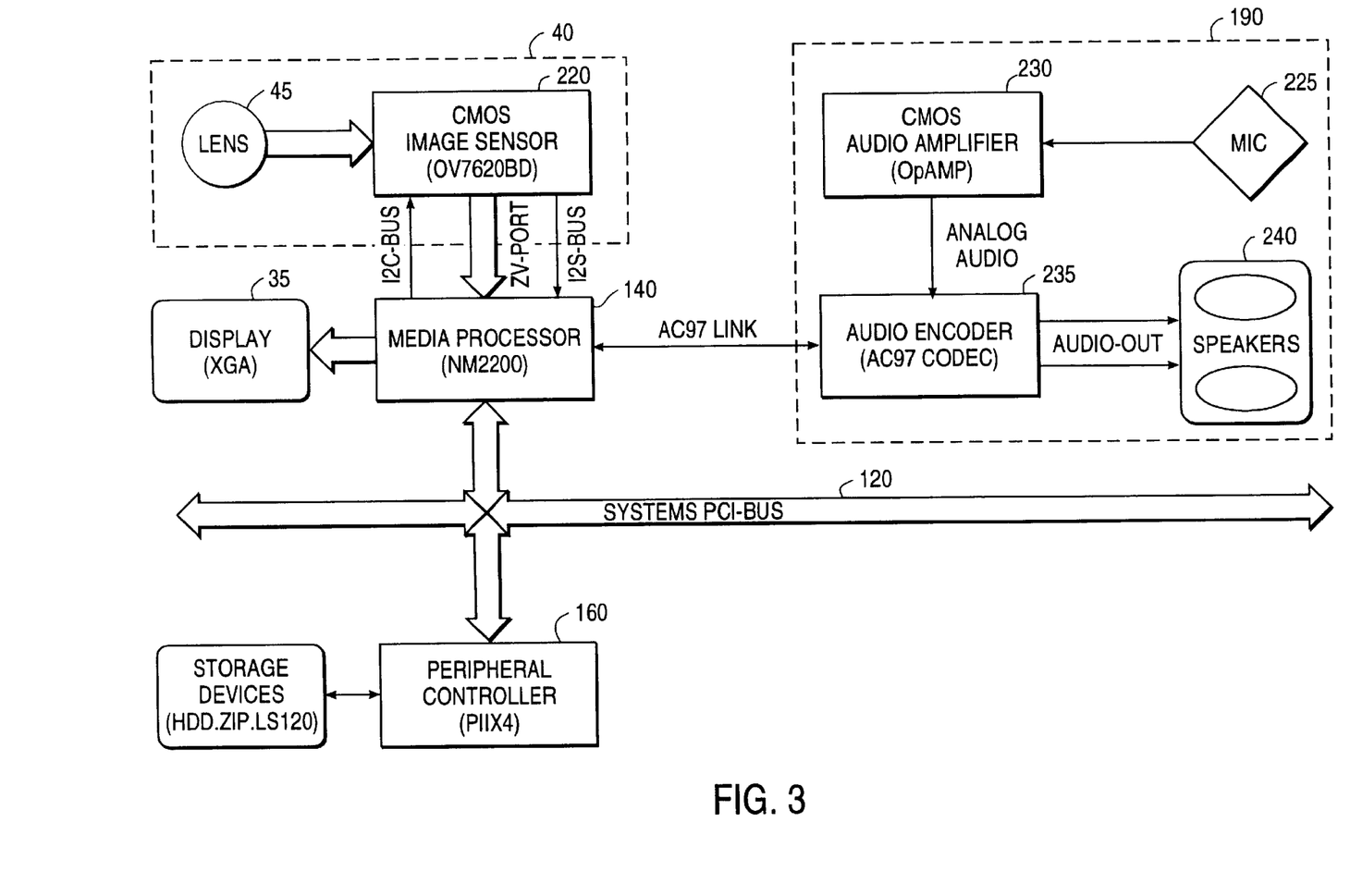
FIG. 3 is a hardware block diagram of the multimedia subsystem according to the invention.

FIG. 3 is a hardware block diagram showing additional details of the elements that can be considered to constitute the multimedia subsystem within system 10. Corresponding reference numerals are used for corresponding elements shown in FIGS. 1 and 2. The multimedia subsystem hardware includes camera 40, audio encoding sound subsystem 190, media processor 140, the high-capacity fast storage devices, and the high-bandwidth communications modules. While an actual hardware implementation of the modules is described for concreteness, embodiments may vary according to platform-specific differences.

Embedded CMOS camera 40 includes, in addition to previously mentioned lens 40, an imaging array 220 (referred to as the camera chip) for generating pixel data corresponding to the image formed by lens 45. The camera will be described in greater detail below.

Audio subsystem 190 includes a microphone 225, which communicates with a CMOS audio amplifier 230. The analog audio output from amplifier 230 is communicated to an audio encoder/decoder (codec) 235, which provides a digital audio stream to media processor 140. The connection is bidirectional, so that codec 235 can receive a digital audio stream from media processor 140 and convert it to an analog audio signal for output to a set of speakers 240.

Multimedia Software

Figure 4:
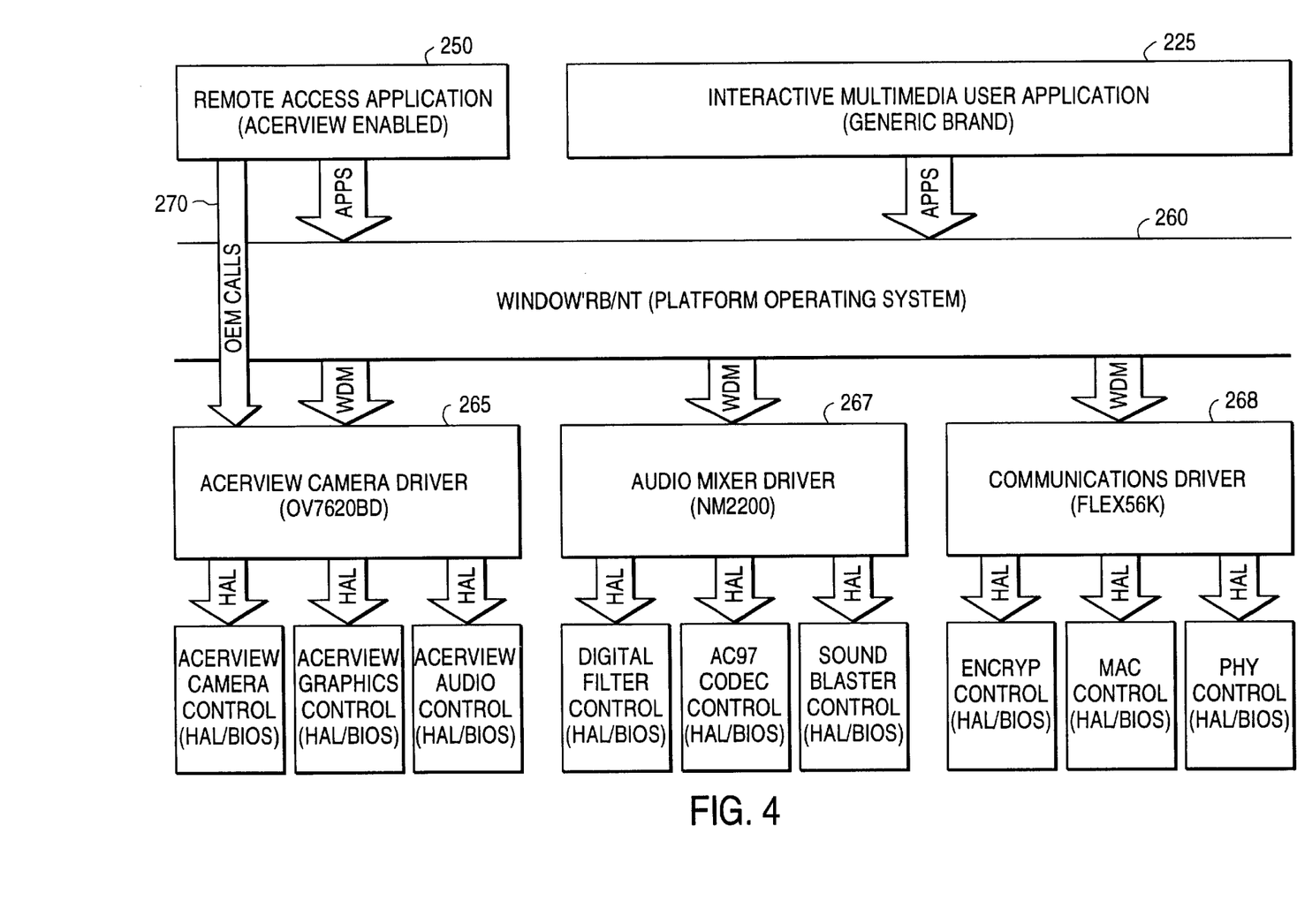
FIG. 4 is a software block diagram of the multimedia subsystem according to the invention.

FIG. 4 is a software block diagram of the multimedia subsystem. The multimedia subsystem software includes, from the top down, interactive user applications, including OEM specific applications 250 and generic applications 255, the operating system 260 (Windows '98/NT in the specific embodiment), a set of OEM-enhanced user interface WDM driver control panels, and a platform-specific HAL/BIOS service layer. The drivers include a camera driver 265, an audio mixer driver 267, and a communications driver 268.

Because the actual hardware implementation of the modules may vary according to the platform-specific differences, the OEM-customizable HAL/BIOS service layer must be added to the OEM-specific WDM drivers. Also, to maintain the compatibility with generic user applications, all OEM-specific enhancement calls (shown as 270) must be implemented on top of standard OS function (WDM) calls. Consequently, all generic applications should work seamlessly while the OEM-enabled applications take full advantage of the added enhancement features.

3.0 CMOS Camera Implementation

Figure 5:
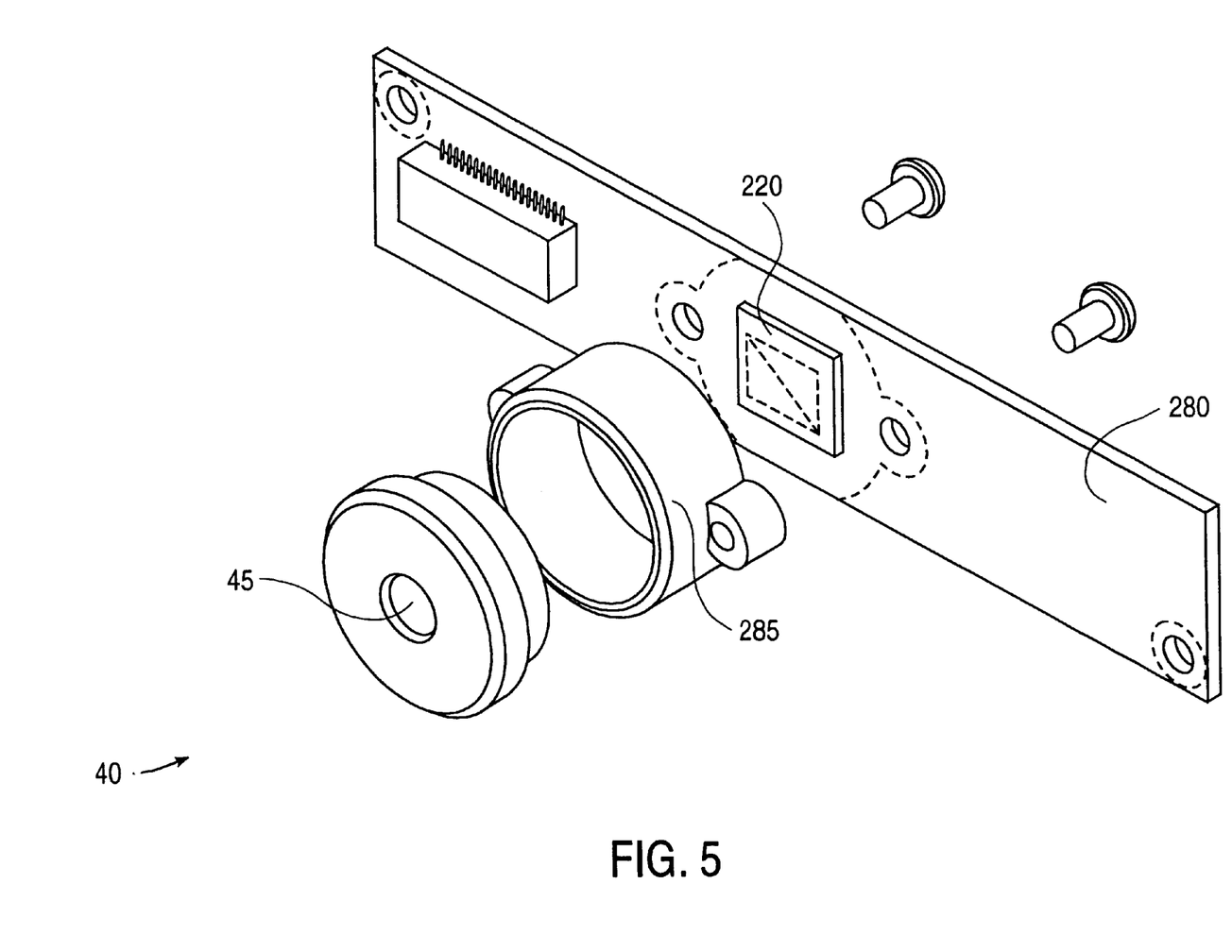
FIG. 5 is an exploded perspective view of the camera assembly.

FIG. 5 is an exploded perspective view of camera 40. The camera is an assembly that includes camera chip 220, a circuit board 280 on which the camera chip and additional support circuitry are mounted, a lens holder 285 mounted to the circuit board, and lens 45 mounted on the lens holder. In a specific embodiment, the camera chip is a Model No. OV7620BD CMOS color digital video image IC available from OmniVision Technologies, Inc. (930 Thompson Place, Sunnyvale, Calif. 94086).

The particular camera chip includes a 640×480 pixel array and associated circuitry. The particular circuitry is not part of the invention, and will only be described briefly. The circuitry includes a video timing generator, a set of programmable registers coupled to an inter-IC bus ($I^2C$) interface, analog processing circuitry for conditioning the raw pixel data, and analog-to-digital converters for providing digital pixel data at a ZV port. The camera chip is capable of operating at up to 60 Hz interlaced or 30 Hz progressive and can output RGB or YUV color data.

In contrast to CCD sensors, which are accessed by row, the CMOS camera chip allows individual pixel access. This makes it possible for the chip to provide a windowing feature that allows selective output of data from a desired portion of the pixel array. This is accomplished by loading vertical and horizontal start and end locations into the registers.

In a preferred embodiment, lens 45 is a fixed focal length lens that provides a field of view on the order of 65–70 degrees. Accordingly, panning and zooming can be accomplished in software. For panning, a fixed size window (typically half size) is moved across the pixel array in response to user input signals. For example, the user may operate a screen controller (such as a slider), or may specify movement in other manners using pointing device 32. These user actions are translated to signals that cause corresponding changes to be made to the start and end values that are loaded into the camera chip registers. Clearly, for a fixed window size, the difference between the start and end values (vertical and horizontal) must remain constant. Similarly, for zooming, the window size is changed while maintaining the same center position.

4.0 Software Implementation
User control panel

Figure 6:
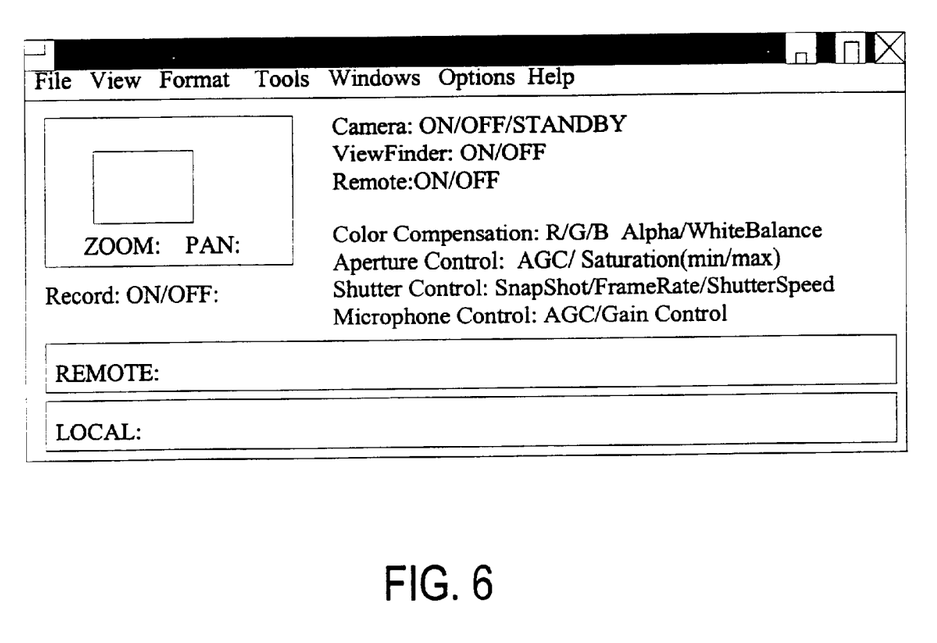
FIG. 6 shows a representation of a screen window that provides an interactive graphics control panel for implementing the camera-module specific control mechanisms.

FIG. 6 shows a representation of a screen window that provides an interactive graphics control panel for implementing the camera-module specific control mechanisms. This is partially in view of the fact, noted above, that the camera module control mechanism is through the $I^2C$ bus protocol. All Windows '98-specified function calls are also supported to meet the PC '98 multimedia audio-video requirements, either by emulation or substitution.

In a specific implementation the local user's control panel provides the following control mechanisms:

1. Camera ON/OFF/STANDBY (power rail and low power control bits);
2. ViewFinder ENABLE/DISABLE (local ZV frame buffer frame and locator enable/disable);
3. Remote controller ENABLE/DISABLE (allow configuration function calls or not);
4. ICONization ENABLE/DISABLE (to allow parking the control panel on the Windows '98 control bar);
5. ZOOM slider/selector (graphical slider for "digital zooming" frame);
6. PAN slider/selector (graphical frame-in-frame locator for "digital panning");
7. RGB color compensation slider/selector (color, hue, alpha, white balancing, etc.);
8. Aperture/gain control slider/selector (AGC on/off, color saturation floor/ceiling control);
9. Shutter/frame control slider/selector (record, snap shot, frame rates, shutter speed);
10. Microphone input gain control slider/selector (normalize and gain controls);
11. "Sub-title" message encoder and decoder text bars (for remote communication and sub-titling).

In one specific embodiment, digital or software panning and zooming are implemented as sliders or other screen controllers, which are displayed along with a frame representing the camera window located within a potentially larger frame representing the maximum window (the entire pixel array). As the user manipulates the screen controllers, the smaller frame moves and resizes itself within the larger frame.

In an alternative embodiment, the panning and zooming are effected by direct manipulation of the smaller frame. For panning, the user would position the cursor within the smaller frame and drag the smaller frame to desired positions within the larger frame. For zooming, the user would resize the smaller frame by dragging on a corner of the smaller frame. The smaller frame would resize from its center. In the case of zooming in, where the user drags outwardly, when one side of the smaller frame reaches an edge of the larger frame, continued dragging would cause other edges of the smaller frame to continue moving outwardly, thus superimposing a pan on the zoom.

All Windows '98-specified function calls and all camera module specific local user's control panel functions specified above are preferably made available for remote users as OEM extended function calls.

Driver Implementation Requirements

With respect to the I²C bus interface, the camera module driver utilizes the I²C bus interface controller on the PIIX4 peripheral controller chip to program the camera chip. With respect to the ZV interface port, the camera module utilizes the secondary ZV port located on media processor 140 for the digital video stream from camera chip 220.

5.0 Conclusion

While the above is a complete description of specific embodiments of the invention, various modifications, alternative constructions, and equivalents may be used. Therefore, the above description should not be taken as limiting the scope of the invention as defined by the claims.

What is claimed is:

1. A laptop computer system comprising:
a system bus;
a CPU coupled to said system bus;
a memory device in communication with said CPU;
a graphics controller in communication with said CPU;
a display in communication with said graphics controller;
a lid portion having a display housing holding said display in a normally vertical orientation during use; and
a video camera fixedly mounted to said display housing at a position above said display, said video camera having a fixed focal length lens and an imaging array;
said video camera being coupled to said graphics controller through a dedicated port so as to provide pixel data for output to said display without traveling over said system bus;
program code stored in said memory device for execution by said CPU, said program code operable to control the transfer of pixel data from said video camera to said display so as to implement digital panning and zooming.

2. The system of claim 1 wherein said imaging array is a CMOS sensor array.

3. The system of claim 1 wherein said dedicated port is a zoomed video port.

4. A laptop computer system comprising:
a CPU;
a memory subsystem;
a peripheral bus;
a controller providing communication paths among said CPU, said memory subsystem, and said peripheral bus;
a graphics controller coupled to said peripheral bus;
a display in communication with said graphics controller;
a lid portion having a display housing holding said display in a normally vertical orientation during use;
a video camera fixedly mounted to said display housing at a position above said display, said video camera having a fixed focal length lens and a CMOS sensor imaging array;
said video camera coupled to said graphics controller through a dedicated port so as to provide pixel data for output on said display without traveling over said peripheral bus; and
program code stored in said memory subsystem for execution by said CPU, said program code operable to control the transfer of pixel data from said video camera to said display so as to implement digital panning and zooming.

5. The system of claim 4 wherein said peripheral bus is a PCI bus.

6. The system of claim 4 wherein said dedicated port is a zoomed video (ZV) port.

7. The system of claim 4 wherein said graphics controller and said controller additionally communicate via a path that is distinct from said peripheral bus.

8. The system of claim 7 wherein said path is an advanced graphic port (AGP).

9. The system of claim 4 wherein said video camera has a lens that provides a field of view on the order of 65–70 degrees.

10. The system of claim 4 wherein said program code provides a control panel on said display, said control panel including a graphical slider to receive user input to effect digital zooming.

11. The system of claim 4 wherein said program code provides a control panel on said display, said control panel including a graphical frame-in-frame locator to receive user input to effect digital panning.

12. A laptop computer system comprising:

a CPU;

a memory subsystem coupled to said CPU;

a peripheral bus;

a controller providing communication paths among said CPU, said memory subsystem, and said peripheral bus;

a media processor coupled to said peripheral bus;

said media processor also being coupled to said controller on a bypass path that avoids said peripheral bus;

a display coupled to said media processor;

a lid portion having a display housing holding said display in a normally vertical orientation during use;

a video camera fixedly mounted to said display housing at a position above said display, said video camera coupled to said media processor through a dedicated port so as to provide pixel data for output to said display without traveling over said peripheral bus; and program code stored in said memory device for execution by said CPU, said program code operable to control the transfer of pixel data from said video camera to said display so as to implement digital panning zooming.

13. The system of claim 12 wherein:

said bypass path uses an advanced graphics port (AGP);

said peripheral bus is a PCI bus; and said dedicated port is a zoomed video (ZV) port.

14. The system of claim 12 wherein said program code provides a control panel on said display, said control panel including a graphical slider to receive user input to effect digital zooming.

15. The system of claim 12 wherein said program code provides a control panel on said display, said control panel including a graphical frame-in-frame locator to receive user input to effect digital panning.

16. The system of claim 12 wherein said video camera includes a CMOS sensor imaging array.

* * * * *